2,956,860
PROCESS FOR PRODUCING MANGANESE DIOXIDE

Jay Y. Welsh, Brainerd, Minn., assignor to Manganese Chemicals Corporation, Minneapolis, Minn., a corporation of Minnesota No Drawing. Filed Apr. 11, 1957, Ser. No. 652,082

7 Claims. (Cl. 23—145)

This invention relates to the art of making battery-grade manganese dioxide and particularly to catalyzing the manganese dioxide-producing reaction between manganese sulfate and alkali metal chlorate. More specifically, the present invention is concerned with improvements in the process of converting precipitated manganese carbonate into a manganese dioxide product having depolarizing properties at least as good as, and preferably better than, those of electrolytic manganese dioxide, which improved process comprises the catalyzed reaction just mentioned.

It heretofore has been proposed to roast precipitated manganese carbonate in air whereby to convert by far the greater part of the manganous compound to manganese dioxide; also, to improve the utility of the roasted product—as regards its efficiency as a dry cell depolarizer—by extracting as much as possible of the residual divalent manganese content of the roasted product by leaching the same with aqueous acid.

It is known to produce battery-grade manganese dioxide by reacting manganese sulfate with alkali metal (e.g., sodium) chlorate in the presence of free sulfuric acid. In this known procedure, the reaction efficiency is poor, yielding a high percentage of chlorine dioxide ($ClO_2$) by-product not utilized in the desired reaction. Moreover, the known procedure involves relatively high acid concentration and a relatively high temperature for favoring the reaction, and a relatively long reaction time, which combination of conditions raises very serious corrosion problems as to processing equipment and contributes to a high cost of producing the manganese dioxide.

In investigating the chlorate reaction, I have found that the reaction between alkali metal chlorate and manganese sulfate may take one or another of two courses as represented by Equations 1 and 2 following:

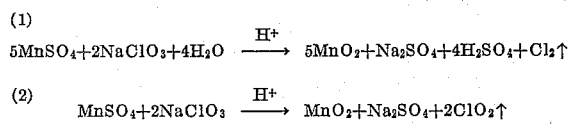

Reaction No. 1 makes efficient use of the oxidizing capacity of sodium chlorate, producing 5 moles of $MnO_2$ for each 2 moles of $NaClO_3$ reacted. Reaction No. 2, on the other hand, is only one-fifth as efficient, producing only one mole of $MnO_2$ for each 2 moles of $NaClO_3$ reacted.

It is, of course, obviously more desirable that the oxidation proceed by Reaction No. 1. The extent to which each reaction participates in a given oxidation can be ascertained in any one of three different ways:
(1) Ratio of $Cl_2$ to $ClO_2$ evolved;
(2) Acid build-up, resulting from Reaction No. 1 only; and
(3) Ratio of $MnO_2$ produced to $NaClO_3$ used.

In the heretofore proposed oxidation (of $MnSO_4$ to $MnO_2$ by means of $NaClO_3$) as reported in an unclassified report entitled "Final Report, March 1, 1953, to February 28, 1955; Study to Formulate Chemical Process for the Production of Battery Grade Manganese Dioxides," issued by Western Electrochemical Company to U.S. Army Signal Corps Laboratories under Contract No. DA36–039SC42694; Army Project No. 3-99-09-022, Signal Corps Project No. 162B, the ratio of pounds of $NaClO_3$ reacted to pounds of $MnO_2$ produced averaged about 1.36, the best figure reported being 0.86. The theoretical ratio, for 100% Reaction No. 1, is (as discussed below) about 0.468.

It has now been found that the reaction of manganese sulfate with alkali metal, e.g., sodium, chlorate—to the production of manganese dioxide—can be very favorably influenced by having present in the reaction mixture an at least significant amount of a "catalytically-acting manganese dioxide product" (which expression will be discussed in further detail below), e.g., a manganese dioxide product produced by roasting precipitated manganese carbonate under oxidizing conditions, e.g., in air. With such catalytically acting $MnO_2$ product present, the efficiency of the $NaClO_3$ oxidizing agent can be very greatly improved; the time of reaction can be cut to about one-sixth the time necessary for the uncatalyzed reaction; the reaction can be effected at lower concentration of acid and at lower temperatures.

Illustrative of catalytic effect are the data of the following comparative experiments carried out under identical conditions except that in the first experiment no catalytically active $MnO_2$ was present:

EXPERIMENT I 500 ml. of solution containing 54 g./l. of manganese as $MnSO_4$ and 66 g./l. of $H_2SO_4$ was heated to 85° C., at which point 25 grams $NaClO_3$ was added. The temperature was then maintained, with agitation, for 30 minutes. Analysis showed less than 0.6% of the manganous ion had been converted to $MnO_2$.

EXPERIMENT II

The above experiment was repeated; but 500 grams of catalytically active $MnO_2$ was incorporated into the slurry. After the one-half hour reaction period, analysis showed that 74.4% of manganous ion had been converted to $MnO_2$.

It is an interesting fact that the $MnO_2$ produced by the $MnSO_4$—$NaClO_3$ reaction does not catalyze said reaction.

With respect to efficiency of $NaClO_3$, the following may be noted. The theoretical ratio of $NaClO_3$ used to $MnO_2$ produced, based on Reaction No. 1—assuming that the "$MnO_2$" produced contains 60% manganese and that the $NaClO_3$ used is 99% pure—is 215/459.5, equals 0.468. Based on Reaction No. 2, the ratio would be 2.35. The highest reported efficiency ratio for the uncatalyzed reaction was (as noted above) 0.86. In carrying out the catalyzed reaction of the present invention, the ratio of $NaClO_3$ used to $MnO_2$ produced has varied between a high of 0.63 to a low of 0.56. As will be appreciated, an actual (production) ratio of 0.56 indicates that 79% of the reaction proceeded according to Reaction No. 1; in contrast, the ratio of 0.86 (the best figure realized in the uncatalyzed reaction) indicates that only 43% of the reaction proceeded according to Reaction No. 1. It is to be observed, here, that the above-mentioned 0.56 ratio includes minor processing inefficiencies, not involved in a laboratory process, which tend to raise the ratio slightly; also, and more importantly, said 0.56 ratio represents the over-all balance, including some excess $NaClO_3$ purposefully used for speeding up the maximum oxidation within a commercially feasible working cycle.

With regard to shortening the reaction time, it may be noted that whereas the uncatalyzed reaction was reported as proceeding at the rate of 14.7 grams $MnO_2$ per liter of slurry per hour, the catalyzed reaction has been observed to proceed at the rate of 86 grams $MnO_2$ per liter of slurry per hour. This six-fold increase in the rate of reaction constitutes striking evidence of the catalytic effect of the added $MnO_2$.

As regards temperature advantage, it may be noted that a temperature of 90° C. or above appears to be necessary (or, at least, desirable) for carrying out the uncatalyzed reaction, whereas it has been found that the most favorable temperature for the catalyzed reaction is 80°–90° C., specifically, about 85° C.

The effect of catalytic $MnO_2$ on the acid level required to promote the $NaClO_3$—$MnSO_4$ reaction is marked. The uncatalyzed reaction is dependent upon a strongly acid medium; for example, an acid level of at least 100 g./l. of $H_2SO_4$, appears to be the lower limit, and even higher concentrations seem advantageous. In the catalyzed reaction, on the contrary, an acid level of 100 g./l. of $H_2SO_4$ represents a practical upper limit, while better results flow from the use of solutions initially containing little or no free acid in solution. Thus, in a series of runs, in which the solids content of the slurry was maintained at 50%, the reaction temperature 83°–85° C., the amount of catalytic $MnO_2$ used was 500 grams, the weight of $NaClO_3$ used was 25 grams and the weight of $MnSO_4$ used was 27 grams, the initial acid level-percentage conversion relationships were as follows:

| Run | Reaction Time, hrs. | $H_2SO_4$ Initially present, gms./l. | Percent Mn converted to $MnO_2$ |
|---|---|---|---|
| A | 2 | 82 | 83.7 |
| B | 2 | 150 | 67.0 |
| C | 1.5 | 54 | 93.7 |
| D | 2 | 20 | 96.0 |

It should be stated, in this connection, that the reaction has been carried out, with excellent efficiency, where the initial slurry was neutral (pH 7.0).

For example, 100 grams of roasted $MnCO_3$ (approximately 80% $MnO_2$, balance manganous ion mostly $MnCO_3$), 67 grams of $MnSO_4$ in neutral solution, 33 grams of $MnCO_3$ and 99 grams of $NaClO_3$ were slurried in 1500 ml. of water and reacted for 1.5 hours at 85° C. The final analysis showed a conversion of soluble manganous ion to $MnO_2$ of better than 99%.

While the above findings would indicate that the acid level should be kept very low—at least, at the outset of the reaction—for best reaction efficiency, experience in the art of making battery-active $MnO_2$ has shown it to be desirable that the $MnO_2$ produced be exposed to a sulfuric acid solution containing about 10% acid to enhance its battery performance. Accordingly, it is preferred that at least during the final stage of the reaction there be present from about 70 to about 100 grams of $H_2SO_4$ per liter.

The ratio of $ClO_2$ to $Cl_2$ evolved in the chlorate oxidation step indicates which of Reactions Nos. 1 and 2 is predominating and to what extent. An analysis of the $ClO_2$ to $Cl_2$ ratio evolved, in a laboratory demonstration of the process of the invention, during the principal reaction period of the catalyzed process showed the following:

| Test | Molar Gas Ratio, $2[ClO_2]/[Cl_2]$ | Percent Oxidation by Reaction 1 |
|---|---|---|
| 1 | 10/90 | 90 |
| 2 | 10/65 | 87 |

Thus, under the more nearly ideal conditions of laboratory tests, the $NaClO_3$—$MnO_2$ ratio of the present catalyzed process becomes 0.51.

The dioxide produced by the catalyzed oxidation of $MnSO_4$ by $NaClO_3$ has been found to be as valuable in dry cell use as—or more valuable, than—the dioxide produced by the uncatalyzed reaction.

Relative to catalytically acting forms of manganese oxides, it should be noted, here, that some types of hydrated $MnO_2$, having a delta type crystal structure, exhibit, to some extent, the same catalytic effect on the $MnSO_4$—$NaClO_3$ reaction as does the above-described $MnO_2$ resulting from the roasting of precipitated $MiCO_3$: it has been observed, however, that the aforesaid hydrated variety requires a somewhat higher acid level for comparable results.

Illustrative of the catalytic effect of the hydrated manganese dioxide, and of the non-catalytic effect of electrolytically produced manganese dioxide, having a gamma type crystal structure, are the following results of comparative experiments carried out under identical conditions.

In test "a" an aqueous slurry was prepared containing 40 grams of $NaClO_3$, 100 grams of $MnCO_3$, 130 grams of $H_2SO_4$ and 1,000 grams of electrolytic $MnO_2$ (gamma type crystal structure), and the slurry was maintained at about 85° C., with agitation, for about 30 minutes. The solids content of the reaction mixture were then isolated and analyzed for manganese dioxide produced by the $MnSO_4$—$NaClO_3$ reaction.

Test "b" duplicated test "a" except that in lieu of the 1,000 grams of electrolytic manganese dioxide there was used 1000 grams of the aforesaid hydrated manganese dioxide. The results data were as follows:

| Test | $MnO_2$ produced by $MnSO_4$—$NaClO_3$ reaction, grams | Lbs. of $NaClO_3$ per lb. of $MnO_2$ produced |
|---|---|---|
| "a" | 6.4 | 6.25 |
| "b" | 66.0 | 0.608 |

It is noted that the above 0.608 ratio compares favorably with the 0.56 ratio realized when catalyzing the reaction with manganese dioxide produced by roasting manganese carbonate under oxidizing conditions. The 6.25 ratio represented no catalytic effect on the part of the electrolytic manganese dioxide.

On the basis of the foregoing, I have found that the above-described catalyzed $NaClO_3$—$MnSO_4$ reaction can, with very advantageous results, be integrated into the heretofore-proposed process for converting precipitated manganese carbonate—preferably, the $MnCO_3$ produced by the carbamate process—to battery-active manganese dioxide, the resulting improved process comprising, in outline, the steps of:

(a) Leaching the roasted $MnCO_3$, which has been oxidized to about 80% $MnO_2$ with aqueous $H_2SO_4$ to extract the soluble manganous ion as $MnSO_4$;

(b) Reacting the resulting slurry, containing solid, particulate $MnO_2$, with $NaClO_3$ at a temperature between about 80° and about 90° C., and (c) Separating the resulting solids from the resulting liquid phase and finally drying the washed solids.

Procedurally, the process may be carried out as follows: The roasted carbonate and water are charged into an agitated reaction tank in such proportions as to make an aqueous slurry containing approximately 65% solids by weight; sufficient sulfuric acid is added to the slurry to bring the weight ratio of sulfuric acid to manganese dioxide to 12/100, and the temperature of the aqueous acidic slurry is raised to about 85° C. and there maintained, with agitation, for about 30 minutes. At this stage, substantially all of the manganous ion (mostly, manganese carbonate) has been leached, as sulfate, from the roasted solids. Sodium chlorate is now added, in the approximate weight ratio of 5 parts of sodium chlorate to 100 parts of manganese dioxide, and the reaction mixture is agitated, while being maintained at a temperature within the range 80–90° C. (preferably, 85° C.), for about 20 minutes, by the end of which interval substantially all of the manganese sulfate content of the reaction mixture will have been converted to manganese dioxide. Preferably, in the carrying out of this step the temperature of the reaction mixture is maintained at about 80°–85° C. until the last 15 minutes, when the temperature is raised to 95° C. The resulting reacted slurry is then washed (in the same, or a different, tank) with water until the clear wash water has a pH of at least 5.0, and the washed solids of the reaction slurry are dried.

While the above represents a complete process, it may be( and preferably is) modified by integrating a fourth step between the above steps "b" and "c," which fourth step is the following. After a substantial portion of the leached-out manganese sulfate has been converted to dioxide, there may be added to the reaction mixture sulfuric acid, sodium chlorate and manganese carbonate in about the following weight ratios: 25 parts of $H_2SO_4$ to 40 parts of sodium chlorate to 100 parts of manganese carbonate, and the temperature maintained at 80°–85° C. for about 40 minutes, with agitation, and then raised to about 95° C. and there maintained for a further period of 15–30 minutes.

What occurs in this second reaction step may be represented by the following equation:

(3)

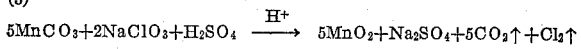
$$5MnCO_3 + 2NaClO_3 + H_2SO_4 \xrightarrow{H^+} 5MnO_2 + Na_2SO_4 + 5CO_2\uparrow + Cl_2\uparrow$$

The amount of $MnCO_3$—and associated reactants—which can be added at this reaction stage may be varied—depending upon the amount of chlorate-produced dioxide desired—between nil and an upper limit which is determined by the practical cessation of catalytic activity of the initially introduced $MnO_2$ (of the roasted $MnCO_3$). In this connection it is to be noted that when the weight ratio of $MnCo_3$ (added in the second reaction step) to the $MnO_2$ introduced at the beginning of the first reaction step exceeds 60/100 there occurs some loss of reaction efficiency. Although the reaction efficiency is tolerable within the range 60/100 and 100/100, it is preferred to limit the carbonate addition at about 60/100 for commercial procedure.

In carrying out the above, optional second reaction step in which the amount of acid is that necessary to supply the sulphate ion lost as sodium sulphate in the equation

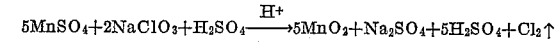
$$5MnSO_4 + 2NaClO_3 + H_2SO_4 \xrightarrow{H^+} 5MnO_2 + Na_2SO_4 + 5H_2SO_4 + Cl_2\uparrow$$

the "fresh" reactants may be added to the reaction mixture of the first reaction step in dry state or in slurry form. Thus, the chlorate may be dissolved in water, the carbonate slurried in the solution and the slurry added to the first reaction mixture. It is to be noted that for desirable operation the chlorate should be added before or with the carbonate—not after.

It will be appreciated that when the above-described second reaction step is integrated into the previously described process the recovered maganese dioxide product represents the sum of the initially added, catalytically active $MnO_2$ and the $MnO_2$ produced by reacting $NaClO_3$ with manganous ion (be it in the form of manganese sulfate, or in the form of manganese carbonate in acidic medium).

The invention will be further described in connection with the following specific example:

In an agitator-equipped, ceramic-lined reaction tank about 100 parts by weight of a roasted particulate $MnCO_3$, containing about 80% $MnO_2$ with balance mostly $MnCO_3$, and having an apparent density of at least 21 grams per cubic inch, was slurried in about 54 parts by weight of water to yield a slurry of about 65% solids. To this slurry sulfuric acid was added in the weight ratio of 12 parts $H_2SO_4$ to 100 parts $MnO_2$, and the acidified slurry was heated to 85° C. and agitated for about 30 minutes. At the conclusion of this stage the free acid concentration was between 5 and 15 grams per liter. $NaClO_3$, in dry form, was then added in a weight ratio of 5 parts to each 100 parts of $MnO_2$. While continuing the agitation, the reaction mixture was maintained at 80°–85° C. for about 20 minutes to insure complete reaction between chlorate and sulfate. Thereafter, 2.5 parts by weight of $H_2SO_4$, 4 parts of $NaClO_3$ and 10 parts of precipitated (particulate) $MnCO_3$ was added, and the reaction mixture was stirred, while maintaining the temperature at 80–85° C., for about 40 minutes and finally at about 95° C. for a further period of about 30 minutes, whereat the reaction was complete.

The final reaction mixture was transferred to a continuous decantation tank and there washed, with tap water, for a period of several hours and until the pH of the overflow wash water was about 5.0. The washed solids and associated water were then transferred to a thickener and eventually to a rotary dryer (indirectly fired) where the solids were dried, preferably at a temperature within the range 100°–150° C., after which the dry $MnO_2$ product was suitably packaged.

The yield of $MnO_2$ product was approximately 6950 pounds, of which total about 5450 pounds represented initially added, catalytically acting $MnO_2$ and about 1500 pounds represented chlorate-produced $MnO_2$. The $MnO_2$ product was of battery grade, and had an apparent density of at least 20 grams per cubic inch. The battery performance of this $MnO_2$ product is represented in the following table, under item "2," in which table its battery performance is compared with those of $MnO_2$ made by roasting precipitated $MnCO_3$ and leaching the roast product with acid, item "1"; $MnO_2$ made by the conventional (uncatalyzed) $MnSO_4$—$NaClO_3$ reaction, item "3"; and $MnO_2$ electrolytically produced, Government Specification No. 3175, as a control for comparison, item "4."

In the battery performance tests represented in the following table the tests were made by, and in accordance with the procedure standardized by, the Squire Signal Corps Laboratory, Fort Monmouth, N.J. The numerical values tabulated under the heading "High drain" represent the hours of continuous discharge, through a 16.67 ohm resistor to 1.00 volt, while those under the heading "Low drain" represent the hours of continuous discharge, through a 166.67 ohm resistor, to 1.13 volts.

*Table of battery data*

(Squire Signal Corps Laboratory)

[A" size cells]

| $MnO_2$ Item | Cell Lots | High Drain | Low Drain |
|---|---|---|---|
| 1 | average of three | 6.3 | 112.3. |
| 2 | average of three | 6.1 | 143.3. |
| 3 | average of five | 6.06 | 142.2. |
| 4 | Gov't. electrolytic $MnO_2$, Battery Grade; Specification No. 3175. | 5.5 minimum | 130 minimum. |
|  | Normal Range | 5.5–7.0 | 130–140. |

In another battery test, conducted under the same conditions as set out above, a product (about to be described) made by the process of the present invention showed an average "High drain" of 7.75 hours and an average "Low drain" of 143 hours. Said superior battery-grade manganese dioxide product was produced as follows:

| | Pounds |
|---|---|
| $MnO_2$ added (made from pptd. $MnCO_3$) (and being about 80% $MnO_2$) | 5051 |
| $NaClO_3$ added | 1285 |
| $MnCO_3$ (as such) added | 3080 |
| $H_2SO_4$ added | 910 |
| $MnO_2$ produced from catalyzed $MnSO_4$—$NaClO_3$ reaction | 2306 |
| Pounds of $NaClO_3$ used per 1 pound of $MnO_2$ produced | 0.56 |

It is to be noted that of the above $MnO_2$ product, 34% of the contained manganese had been oxidized by the catalyzed chlorate process—that is to say, a 34% modification of the original roasted carbonate. It has been found that any modification of from 10% upward is adequate for raising the "Low drain" characteristic of the leached roasted carbonate material to a level above the Signal Corps' "minimum requirement" and within (or above) its "Normal range." Carrying the modification above about 34% incurs a considerable cost disadvantage which appears to outweigh the additional improvement in performance realized thereby.

It is believed that the catalytic activity, or lack of it, of a particular manganese dioxide product with respect to the chlorate oxidation of manganous compounds is to manganese dioxide is closely associated with—or, is to be explained on the basis of—the relative acid adsorption power of the manganese dioxide in question. The attraction of acid to the surfaces of particles of $MnO_2$ produced by roasting precipitated $MnCO_3$ is very marked, whereas electrolytic $MnO_2$ and chlorate-produced $MnO_2$—having substantially the same particle sizes as the former—have much less adsorptive power toward acid. This theory appears to be supported by the observed fact that with substantial accumulation of chlorate-produced $MnO_2$ amongst and upon the initially catalytically active $MnO_2$ particles there occurs a decrease in the catalytic efficiency of the latter which appears to be explainable only in terms of surface blocking of the initially catalytic material. The invention is not, however, dependent upon the correctness of this possible explanation of the demonstrable facts.

The dioxide product produced by the catalyzed oxidation of $MnSO_4$ by $NaClO_3$ can be identified, in part, by X-ray diffraction, for the unique reason that the two phases of $MnO_2$ in the composition show up separately, i.e. each has identifying lines that can be recognized in a qualitative manner.

The chlorate oxidation is operable in connection with such salts of divalent manganese as are soluble and whose anions are not oxidizable by chlorate in acid solution. Common anions that could be used in place of the sulfate include the nitrate, fluoborate, and sulfamate. However, in the foregoing description the reaction has been explained with reference to manganese sulfate because the greater cost of the other salts just named makes their operability of academic interest only.

In the foregoing procedure the feasible upper limit of chlorate-produced manganese dioxide to catalytically active manganese dioxide is represented by the ratio 1:2 (approximate). It has been discovered that the disproportionated $MnO_2$ product resulting from the interaction of both $Mn_2O_3$ and $Mn_3O_4$ with sulphuric acid acts as a very effective catalyst to promote the chlorate-$Mn^{++}$ reaction. In fact, it is a unique feature of the use of these disproportionated products—not inherent in the process above described—that a "self-renewing" catalytic material is formed thereby permitting the ratio of chlorate-produced $MnO_2$ to catalytically active $MnO_2$ to be raised to 2:1 (approximate). This phenomenon may be represented, in the case of $Mn_3O_4$, as follows:

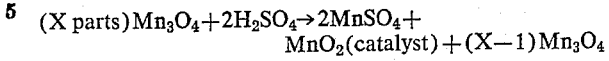

(X parts)$Mn_3O_4 + 2H_2SO_4 \rightarrow 2MnSO_4 +$
$\qquad MnO_2(catalyst) + (X-1)Mn_3O_4$

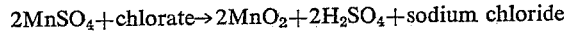

$2MnSO_4 + chlorate \rightarrow 2MnO_2 + 2H_2SO_4 +$ sodium chloride

Then:

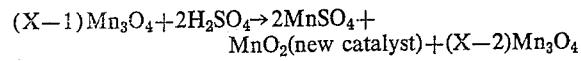

$(X-1)Mn_3O_4 + 2H_2SO_4 \rightarrow 2MnSO_4 +$
$\qquad MnO_2(new\ catalyst) + (X-2)Mn_3O_4$

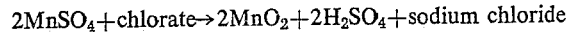

$2MnSO_4 + chlorate \rightarrow 2MnO_2 + 2H_2SO_4 +$ sodium chloride and so on.

During this part of the reaction the chlorate ion is reduced all the way down to $Cl^-$, the ultimate. After the $Mn_3O_4$ is depleted, the $H_2SO_4$ builds up and a chlorine-producing reaction is involved in the final stages, exactly as described in the preceding part of this application.

The phase of the invention just mentioned will, in the following, be explained through discussion, with specific examples, of two alternative procedures one of which—styled herein type "W"—produces a black $MnO_2$ product and the other of which produces a generally brownish $MnO_2$ product—styled herein type "WB." Both type "W" and type "WB" materials have exceptional properties as depolarizing agents. In each case, the black and brown products can be subdivided again in terms of whether they are made from $Mn_2O_3$ or $Mn_3O_4$ as starting material. The processing conditions are parallel in each instance except for the specific proportions of the reactants involved.

I. PRODUCTION OF TYPE "W" $MnO_2$ FROM $Mn_3O_4$

A typical reaction for the production of black type "W" $MnO_2$ product from a starting material consisting essentially of $Mn_3O_4$ produced by oxidizing the previously described precipitated manganese carbonate proceeds as follows:

A solution is made containing 575 grams $NaClO_3$, 300 ml. conc. $H_2SO_4$, and about 2000 ml. of water. The solution is heated to 85° C., and 1500 gms. of $Mn_3O_4$ are added slowly over a three hour period. The reacting slurry is held at 85–87° C. over this three hour period, and then is held an additional two hours at the same temperature in order to complete the reaction. Temperatures in excess of 90° C. tend to decrease the efficiency of the reaction. The black $MnO_2$ thus produced is filtered, washed and then dried at a temperature about 100° C. An analysis of the slurry at the end of the reaction shows the liquid phase to contain:

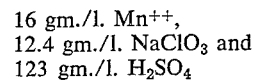

16 gm./l. $Mn^{++}$,
12.4 gm./l. $NaClO_3$ and
123 gm./l. $H_2SO_4$

The product weight after drying is 1710 grams and analyzes 90.5 percent $MnO_2$ and 60.3 percent Mn.

In this reaction the slow addition of the $Mn_3O_4$ is an essential feature. The rate of addition is such that the chlorate-$Mn^{++}$ reaction "keeps up"; thus, acid is regenerated according to the following equation:

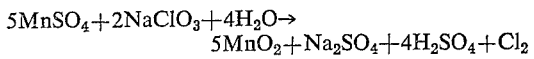

$5MnSO_4 + 2NaClO_3 + 4H_2O \rightarrow$
$\qquad 5MnO_2 + Na_2SO_4 + 4H_2SO_4 + Cl_2$ and the acid level is maintained at something above 65 grams per liter. This is sufficient acid to assure a chlorine ($Cl_2$)-producing reaction and substantially eliminate the possibility of a chloride ($Cl^-$)-producing reaction.

The production of black $MnO_2$ from $Mn_2O_3$ is carried out in an analogous manner. The proportions of reactants involved are different, of course, are as follows:

1500 gms. $Mn_2O_3$
430 gms. $NaClO_3$
260 ml. conc. $H_2SO_4$, and

About 2000 ml. H₂O

Product—1620 gms. (91% MnO₂ and 59.6% Mn)

The analysis of the final reaction slurry shows the liquid phase to contain:

9.4 gm./l. Mn⁺⁺
16.8 gm./l. NaClO₃
121 gm./l. H₂SO₄

II. PRODUCTION OF BROWN "WB" TYPE MnO₂ from Mn₃O₄

This alternative procedure proceeds as follows:

All reagents including the Mn₃O₄ are mixed cold (room temperature).

1500 gm. Mn₃O₄
500 gms. NaClO₃
500 gms. conc. H₂SO₄, and
About 1500 gms. H₂O

The resulting slurry is then heated to 85–87° C. and is maintained at this temperature for a total period of about four hours. The product is then filtered, washed and finally dried at about 100° C. The analysis of the final reacting slurry shows the liquid phase to contain the following:

10 gms./l. Mn⁺⁺
110 gms./l. H₂SO₄
20 gms./l. NaClO₃

The dried MnO₂ product weighs 1710 grams and analyzes 90.5 percent MnO₂ and 60.3 percent Mn.

In this reaction the course of the chemistry is considerably different, resulting in a higher efficiency of chlorate utilization as will be pointed out later.

Again the reaction procedure to produce a brownish type of MnO₂ from Mn₂O₃ is carried out in an analogous manner. The proportions of reactants are as follows:

1500 gms. Mn₂O₃
250 ml. conc. H₂SO₄
350 gms. NaClO₃
About 1500 ml. H₂O

Analysis of the liquid phase of the final slurry gives:

6.4 gms./l. Mn⁺⁺
14 gms./l. NaClO₃
129 gms./l. H₂SO₄

Product—1624 gms. analyzing 90.2% MnO₂ and 60.0% Mn

The chemical reactions involved in the two types of processes will now be considered. For the sake of simplicity we will consider only the Mn₃O₄ reactions; the treatment of Mn₂O₃ is quite similar. The chemical reactions believed possible in the systems involved are as follows:

(1) $Mn_3O_4 + 2H_2SO_4 \rightarrow 2MnSO_4 + MnO_2(\text{catalyst}) + 2H_2O$ (2) $5MnSO_4 + 2NaClO_3 + 4H_2O \rightarrow 5MnO_2 + Na_2SO_4 + 4H_2SO_4 + Cl_2\uparrow$ (3) $MnSO_4 + 2NaClO_3 \rightarrow MnO_2 + Mn_2SO_4 + 2ClO_2\uparrow$ (4) $3MnSO_4 + NaClO_3 + 3H_2O \rightarrow 3MnO_2 + 3H_2SO_4 + NaCl$ (5) $NaClO_3 + 5NaCl + 2H_2SO_4 \rightarrow 3Na_2SO_4 + 3H_2O + 3Cl_2\uparrow$ In the case of the black "W" type of product Reactions 1 and 2 go on simultaneously throughout the addition of Mn₃O₄, Reaction 1 producing the catalytic MnO₂ and Reaction 2 regenerating the H₂SO₄ to produce more catalyst by Reaction 1 and at the same time producing MnO₂ product. When all of the Mn₃O₄ has been added, Reaction 1 terminates and Reaction 2 continues and is carried to near completion. It is to be noted that in this latter phase of the reaction (the last two hours of the procedure), the acid builds up from a value in the vicinity of 60 to 80 grams per liter to about 120 grams per liter.

From an efficiency analysis it is evident that the chlorate oxidation of MnSO₄ does not go entirely by Reaction 2, a small fraction must proceed by Reaction 3. Thus we find the actual reacting ratio of NaClO₃ to Mn₃O₄ is 1/2.6 instead of the theoretical ratio of 1/2.8.

The chemistry involved in the process which produces the brown "WB" type of MnO₂ is more involved. Because all of the Mn₃O₄ is added initially and without the addition of heat, Reaction 1 goes to completion (or essentially so) with respect to the H₂SO₄ before any appreciable chlorate reaction can take place (that is, Reaction 1 takes place at a temperature below that required for either Reaction 2 or 4 to proceed at an appreciable rate). There is, of course, a large excess of unreacted Mn₃O₄ remaining after the initial charge of H₂SO₄ has been depleted. When the slurry is raised to a suitable reaction temperature, 85–87° C., Reactions 1 and 4 take place simultaneously. Reaction 4 regenerates H₂SO₄ to further react with Mn₃O₄ as per Reaction 1 but, since an excess of Mn₃O₄ is present, the reacting slurry remains essentially neutral with respect to acid for a period usually ranging from 1.0 to 1.5 hours. The values given are specific for Mn₃O₄ made from the MnCO₃ previously referred to.

When Reactions 1 and 4 have proceeded to the point that an excess of Mn₃O₄ no longer remains, then Reaction 1 is terminated and acid begins to build up due to Reaction 4. When the acid level reaches a value in the vicinity of 40–60 grams per liter, Reaction 4 terminates and Reactions 2 and 5 begin to take place simultaneously. It might be noted that Reaction 3 does not appear to take place in this system, or if it does it is to such a limited extent that it does not affect the reaction efficiency.

If the oxidation reaction took place entirely according to Reaction 4 the ratio of sodium chlorate to Mn₃O₄ would be 1/3.35. If it took place entirely according to Reaction 2 (as previously pointed out) the corresponding ratio would be 1/2.8. This is also the ratio that would be expected in the over-all process when Reaction 4 is followed by Reaction 5, provided the latter goes to completion. In this system it has been found that the actual reaction ratio is 1/3; thus it can be concluded that under the processing conditions involved Reaction 5 never attains actual completion and some chloride ion is present even at the end of the reaction.

The question of why one type of MnO₂ is black and the other generally brownish logically enters here. The color and performance are no doubt tied in with the crystal structure, although this relationship appears to be rather obscure. The speculated difference in crystal structure is in turn the result of the combined effect of pH and chloride ion concentration. In the case of the type "W" black MnO₂, the acidity of the slurry is high at all times and the chloride ion concentration if present at all is held at a very low level. In the instance of the type "WB" brown MnO₂, the chloride ion concentration builds up to a relatively high level, and since it is generally known that chloride ion has a marked effect on the crystal structure of MnO₂ it is logical to assume that the chloride level is at least partially responsible in any crystalline modification.

It may be speculated that the brown color is probably due to a tendency for a cryptomelane structure to be imposed on the gamma or rho structures that inherently result from a leaching and chlorate oxidation type of processing. Examination by means of X-ray diffraction shows a rho pattern in both instances, with perhaps a mere trace of cryptomelane evident in the case of the brown MnO₂. The physical characteristics of both materials are the same except for color; both have an apparent density in the range of 18 to 21 grams per cubic inch.

The battery data on these new dioxide products, type "W" and type "WB" are unique. There is evidence that the "WB" type may have advantages in several commercial applications over the "W" type, but both are as good as or better than electrolytic MnO₂. The outstanding capabilities of these new dioxides however can be adequately demonstrated in terms of the military tests cited hereinbefore:

| MnO₂ Item | High Drain | Low Drain |
|---|---|---|
| "W" Type—Average of 4 lots | 9.70 | 141 |
| "WB" Type—Average of 4 lots | 9.19 | 135 |

The marked improvement in the high drain capacities over the values hereinbefore shown, of the order of 50 percent, is specifically noted. The slight drop in low drain capacity is primarily due to the fact that the new dioxides under consideration discharge at a higher voltage level and, therefore, dissipate their chemical capacity at a somewhat higher rate.

I have carried out the reactions above recited using $Mn_3O_4$ produced from African (Gold Coast) ore and from Montana ore. The reactions take place exactly as would be expected from the above disclosure; the $MnO_2$ produced by Reaction 1 is catalytically active; and the feasibility of using natural ore as a raw material in preparing the type "W" and type "WB" products is unquestionable. As would have been expected, in carrying out Procedure I above using $Mn_3O_4$ produced from African or Montana natural ore, the rate of addition of the $Mn_3O_4$ to the acidified aqueous solution of chlorate has to be somewhat slower than is the case when using $Mn_3O_4$ produced from our carbonate, due principally to the particle size difference involved.

The following specific example is illustrative of the production of type "WB" $MnO_2$ material from an African natural $MnO_2$ ore:

The ore, which was crushed to minus 300 mesh, analyzed 55.4% Mn. The ore was given a reducing roast, after which the Mn content of the ore was approximately 62.2% and represented about a 90% conversion to $Mn_3O_4$.

A slurry was prepared containing 500 grams $NaClO_3$, 300 ml. conc. $H_2SO_4$ and 1500 gms. of reduced African ore corresponding to $Mn_3O_4$ in about 2000 ml. water. This slurry was heated to 85°–87° C. and maintained at this temperature for a period of about 4 hours to complete the reaction. The slurry was then filtered, washed and dried at about 100° C. The liquid phase of the slurry, at the end of the reaction, contained 14.0 gm./l. $Mn^{++}$
20.0 gm./l. $NaClO_3$ and
117 gm./l. $H_2SO_4$ The solid product after drying weighed 1680 grams, and analyzed 83.7% $MnO_2$ and 55.7% Mn.

The dried product, subjected to the above military test, showed a "high drain" value of 8.0 hours.

Results consistent with the foregoing were realized when substituting Montana ore for the African ore, and when proceeding by way of $Mn_2O_3$ instead of $Mn_3O_4$, and when practicing the procedure for type "WB" material instead of type "W" material.

This application contains subject matter in common with my application Ser. No. 588,239, filed May 31, 1956 now abandoned, and is to be considered a continuation-in-part of the latter.

I claim:

1. In the process of producing manganese dioxide by reacting a solution of manganese sulfate with alkali metal chlorate in aqueous medium, the improvement which consists in effecting the reaction, at an elevated temperature of from about 80° to 95° C., in the presence of a catalytically effective amount of a particulate manganese dioxide material having a catalytic effect on the reaction, said catalytic material being selected from the group of manganese dioxide products consisting of (a) the manganese dioxide product produced by roasting precipitated manganese carbonate under oxidizing conditions, and (b) the manganese dioxide product produced by leaching with sulphuric acid an oxide of manganese in a lower state of oxidation than $MnO_2$ and a higher state of oxidation than MnO.

2. Process of producing battery-grade manganese dioxide, which comprises roasting precipitated manganese carbonate under oxidizing conditions to the production of a roast product the major part of the manganese content of which is manganese dioxide and a minor part of the manganese content of which is in the manganous form, leaching the roast product with aqueous sulfuric acid in an amount and under conditions to convert substantially all of the manganous portion of said roast product to manganese sulfate and to produce an aqueous slurry containing dissolved manganese sulfate and a catalytically active particulate manganese dioxide, reacting said aqueous slurry, at an elevated temperature of from about 80° to about 95° C., with sodium chlorate in an amount at least the stoichiometric equivalent of the manganese sulfate and sufficient to convert the manganese sulfate content of the slurry to manganese dioxide, water washing the resulting solid phase of the resulting reaction mixture, and drying the washed solids.

3. Process defined in claim 2, in which manganese carbonate, sulfuric acid and sodium chlorate are added to the reaction mixture prior to the washing step, the amount of acid so added being that necessary to supply the sulfate ion lost as sodium sulfate in the equation:

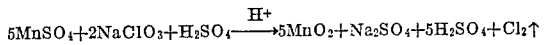

4. Process of producing a battery-grade manganese dioxide product, which comprises treating an aqueous acidic solution of manganese sulfate, containing suspended therein a catalytically active amount of a particulate manganese dioxide material having a catalytic effect on the reaction of manganese sulphate and sodium chlorate, said catalytic material being selected from the group of manganese dioxide products consisting of (a) the manganese dioxide product produced by roasting precipitated manganese carbonate under oxidizing conditions, and (b) the manganese dioxide product produced by leaching with sulphuric acid an oxide of manganese in a lower state of oxidation than $MnO_2$ and a higher state of oxidation than MnO, with sodium chlorate to convert substantially all of the manganese sulfate to manganese dioxide, adding to the resulting slurry additional sodium chlorate, sulfuric acid and particulate manganese carbonate in amounts to provide a reaction mixture according to the equation—

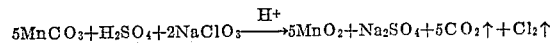

maintaining the mixture at a temperature of from about 80° to about 95° C. until substantially all of the added manganese carbonate has been converted to manganese dioxide, and recovering the solids from the resulting reaction mixture.

5. Process of producing a battery-grade manganese dioxide product, which comprises reacting a starting material consisting essentially of oxide of manganese in a lower state of oxidation than $MnO_2$ and higher state of oxidation than MnO with aqueous sulphuric acid in the presence of an alkali metal chlorate, the amounts of reactants being such as to provide an ultimate reaction mixture according to the equation:

$$5MnSO_4 + 2NaClO_3 + 4H_2O$$
$$\rightarrow 5MnO_2 + Na_2SO_4 + 4H_2SO_4 + Cl_2\uparrow$$

and the reaction mixture being comprised of said reactants and particulate catalytically active $MnO_2$ produced by the disproportionation of the starting material in sulphuric acid, whereby catalytically active manganese dioxide is produced in the reaction mixture, and maintaining the mixture at a temperature of from about 80° to about 90° C. until the reaction is substantially complete, and recovering the solids from the resulting reaction mixture.

6. Process as defined in claim 5, in which the manganese oxide-containing starting material is added slowly and by increments to an aqueous solution of sulphuric acid and sodium chlorate at a temperature of from about 80° to about 90° C.

7. Process as defined in claim 5, in which the manganese oxide-containing starting material is admixed with an essentially unheated mixture of sulphuric acid and sodium chlorate in water under conditions to promote an initial reaction according to the equation:

$$Mn_3O_4 + 2H_2SO_4 \rightarrow 2MnSO_4 + MnO_2(cat.) + 2H_2O$$

and then heating the resulting slurry to and maintaining the same at a temperature within the range 80–90° C. whereby to promote said ultimate reaction.

References Cited in the file of this patent
UNITED STATES PATENTS

| | | |
|---|---|---|
| 1,178,927 | Kaplan | Apr. 11, 1916 |
| 1,275,666 | Ellis et al. | Aug. 13, 1918 |
| 1,293,461 | Kaplan | Feb. 4, 1919 |
| 1,293,463 | Kaplan | Feb. 4, 1919 |
| 1,330,738 | Ellis et al. | Feb. 10, 1920 |
| 2,123,250 | Muller et al. | July 12, 1938 |
| 2,608,466 | Fox | Aug. 26, 1952 |